United States Patent
Kothandaraman et al.

(10) Patent No.: US 12,085,901 B2
(45) Date of Patent: Sep. 10, 2024

(54) BOT MANAGEMENT FRAMEWORK FOR ROBOTIC PROCESS AUTOMATION SYSTEMS

(71) Applicant: Accenture Global Solutions Limited, Dublin (IE)

(72) Inventors: Ramkumar Kothandaraman, Bangalore (IN); Koduvayur Vaidyanathan Ramesh, Bangalore (IN); Suman Sundaravaradan, Chennai (IN); Sunil Balugari, Bangalore (IN); Puneet Kalra, Pune (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1058 days.

(21) Appl. No.: 15/886,341

(22) Filed: Feb. 1, 2018

(65) Prior Publication Data
US 2019/0155225 A1     May 23, 2019

(30) Foreign Application Priority Data
Nov. 21, 2017 (IN) .............................. 201711041688

(51) Int. Cl.
*G05B 13/02* (2006.01)
*G05B 13/04* (2006.01)
(Continued)

(52) U.S. Cl.
CPC ......... *G05B 13/028* (2013.01); *G05B 13/041* (2013.01); *G05B 19/042* (2013.01);
(Continued)

(58) Field of Classification Search
CPC .. G05B 13/028; G05B 13/041; G05B 19/042; G06N 3/006; G06N 20/00; H04L 41/16;
(Continued)

(56) References Cited

U.S. PATENT DOCUMENTS 6,012,152 A * 1/2000 Douik ................. G06F 11/0709
714/26
6,708,296 B1 * 3/2004 Gover ................. G06F 11/3466
714/47.2
(Continued)

FOREIGN PATENT DOCUMENTS

WO    WO 2016154945     10/2016

OTHER PUBLICATIONS

IN Office Action in Indian Appln. No. 201711041688, dated Aug. 17, 2020, 5 pages.

*Primary Examiner* — Christopher E. Everett
*Assistant Examiner* — Tameem D Siddiquee
(74) *Attorney, Agent, or Firm* — Polsinelli P.C.

(57) ABSTRACT

Methods, systems, and apparatus, including computer programs encoded on a computer storage medium, a using a bot management framework to provide bot management solutions for software bots deployed in a robotic process automation (RPA) system. In one aspect, a method includes the actions of receiving, from a RPA system, information regarding a software bot deployed within the RPA system to perform an assigned task, the information including incident data from an anomaly in the RPA system while the software bot performed the assigned task; mapping the received incident data according to a common data model; determining a resolution for the anomaly based an analysis through a trained artificial intelligence model of the mapped incident data; and executing the determined resolution.

20 Claims, 6 Drawing Sheets

(51) Int. Cl.
*G05B 19/042* (2006.01)
*G06F 11/34* (2006.01)
*G06N 3/006* (2023.01)
*G06N 20/00* (2019.01)
*H04L 41/16* (2022.01)
*H04L 41/5019* (2022.01)

(52) U.S. Cl.
CPC ......... *G06F 11/3495* (2013.01); *G06N 3/006* (2013.01); *G06N 20/00* (2019.01); *H04L 41/16* (2013.01); *H04L 41/5019* (2013.01)

(58) Field of Classification Search
CPC ............. H04L 41/5019; G06F 11/3495; G06F 11/3006; G06F 11/0793; G06F 11/3409; G06F 2201/865
See application file for complete search history.

(56) References Cited

U.S. PATENT DOCUMENTS

| | | |
|---|---|---|
| 7,590,680 B2 | 9/2009 | Fernando et al. |
| 7,823,126 B2 | 10/2010 | Kim et al. |
| 2015/0121136 A1* | 4/2015 | Namkoong ........... G06F 11/079 714/15 |
| 2015/0346717 A1* | 12/2015 | Hosek ............. G05B 19/41875 702/183 |
| 2016/0285708 A1* | 9/2016 | Papadopoulos ......... H04L 67/12 |
| 2016/0343244 A1* | 11/2016 | Patterson ............... G08B 25/14 |
| 2017/0069214 A1 | 3/2017 | Dupray et al. |
| 2018/0018393 A1* | 1/2018 | Latapie ................ H04L 41/145 |
| 2018/0370033 A1* | 12/2018 | Geffen ............... G05B 23/0294 |

\* cited by examiner

BOT MANAGEMENT FRAMEWORK FOR ROBOTIC PROCESS AUTOMATION SYSTEMS

CROSS-REFERENCE TO RELATED APPLICATION

This application claims priority to Indian Patent Application No. 201711041688, filed on Nov. 21, 2017, entitled "Bot Management Framework for Robotic Process Automation Systems," the entirety of which is hereby incorporated by reference.

TECHNICAL FIELD

This application generally relates to a management solution framework for a robotic process automation (RPA) system.

BACKGROUND

RPA is the application of technology that allows for the configuration of computer software or a "robot" (bot) to capture and interpret existing applications for processing a transaction, manipulating data, triggering responses, and/or communicating with other digital systems. What distinguishes RPA from traditional information technology (IT) automation is RPA software's ability to be aware and adapt to changing circumstances, exceptions, and new situations. Once an RPA bot has been trained to capture and interpret the actions of specific processes in existing software applications, it can then perform its assigned task autonomously. RPA expedites back-office and middle-office tasks in a wide range of industries, which include, without limitation, manufacturing, health care, telecom, insurance, finance, procurement, supply chain management (SCM), accounting, customer relationship management (CRM), and human resource management (HRM).

SUMMARY

Implementations of the present disclosure are generally directed to a bot management framework. More specifically, implementations are directed to a system using the described bot management framework to provide bot management solutions for software bots deployed in an RPA system. The described system may receive information regarding the software bots deployed in the RPA system, translates the information, and provides, for example, resolution for alerts and exceptions raised by the software bots.

In a general implementation, a system includes one or more processors, and a computer-readable storage device coupled to the one or more processors and having instructions stored thereon which, when executed by the one or more processors, cause the one or more processors to perform operations that include: receiving, from a robotic process automation (RPA) system, information regarding a software bot deployed within the RPA system to perform an assigned task, the information including incident data from an anomaly in the RPA system while the software bot performed the assigned task; mapping the received incident data according to a common data model; determining a resolution for the anomaly based an analysis through a trained artificial intelligence (AI) model of the mapped incident data; and executing the determined resolution.

In another general implementation, a computer-implemented method executed by one or more processors includes: receiving, from a RPA system, information regarding a software bot deployed within the RPA system to perform an assigned task, the information including incident data from an anomaly in the RPA system while the software bot performed the assigned task; mapping the received incident data according to a common data model; determining a resolution for the anomaly based an analysis through a trained AI model of the mapped incident data; and executing the determined resolution.

In yet another general implementation, one or more non-transitory computer-readable storage media coupled to one or more processors and having instructions stored thereon which, when executed by the one or more processors, cause the one or more processors to perform operations that include: receiving, from a robotic process automation RPA system, information regarding a software bot deployed within the RPA system to perform an assigned task, the information including incident data from an anomaly in the RPA system while the software bot performed the assigned task; mapping the received incident data according to a common data model; determining a resolution for the anomaly based an analysis through a trained AI model of the mapped incident data; and executing the determined resolution.

In an aspect combinable with any of the general implementations, the operations further include before mapping the received incident data, validating the received incident data according to data validation rules assigned to the RPA system based on metadata included in the received information.

In another aspect combinable with any of the previous aspects, the operations further include sending the resolution and mapped incident data for the anomaly to a unified view for display to an administrator.

Another aspect combinable with any of the previous aspects, the anomaly is one of the software bot being overloaded, the software bot being underutilized, a service level agreement (SLA) approaching a threshold regarding a breach of the SLA, an exception raised by the software bot or process associated with the software bot, or a central processing unit (CPU) utilization of an infrastructure assigned to execute the software bot reaching a threshold.

In another aspect combinable with any of the previous aspects, the resolution includes allocating the anomaly to a user group.

In another aspect combinable with any of the previous aspects, the resolution includes steps to proactively bring the software bot to a designated performance level.

In another aspect combinable with any of the previous aspects, the resolution includes following an escalation procedure that includes alerting a bot controller assigned to the software bot of the anomaly and determined resolution.

In another aspect combinable with any of the previous aspects, the operations further include persisting the incident data mapped according to the common data model.

In another aspect combinable with any of the previous aspects, the AI model is trained using historical events of the RPA system.

In another aspect combinable with any of the previous aspects, receiving the information regarding the software bot occurs at a scheduled interval and comprises a delta of any previous information received.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

RPA software is especially useful for organizations that have many different and complicated systems that need to interact together fluidly. For example, when an electronic form of a human resource system is lacking a form field, traditional automation software may flag the form as having an exception, and an employee would then handle the exception by, for example, looking up the missing information and entering it into the form. Once the form was completed, the employee might send it on to payroll so that the information could be entered into, for example, the organization's payroll system. With RPA technology, however, in the described example, a software bot that has the ability to adapt, self-learn, and self-correct, handles exceptions, and interacts with the payroll system without human assistance. Furthermore, technologies like presentation-layer automation software—a technology that mimics the steps of a rules-based, non-subjective process without compromising the existing IT architecture—are able to consistently carry out prescribed functions, and scale up or down to meet demand.

The hosting of RPA services provides support for execution of assigned tasks by each software bot with each bot instance having its own virtual workstation, much like a human worker. The bot may use keyboard and mouse controls to take actions and execute automations. In some implementations, all of these actions take place in a virtual environment, and not on screen as the bot does not need a physical screen to operate. Rather, the bot interprets the screen display electronically. RPA hosting solutions provide products and features in a platform architecture designed for security, enterprise grade compliance, and robust governance. Such a platform architecture may be installed in the cloud, or within an enterprise's data center—either on physical or virtual machines—and provide functional components, integrated to deliver enterprise-wide automation solution, such as a process modeling/automation application; the software bots; and a platform-based bot controller. Additionally, the bots may generate execution logs, and statuses for compliance and effective reporting.

In view of the foregoing, implementations of the present disclosure are generally directed to an intelligent and robust bot management framework that may be employed to provide bot management solutions for software bots deployed in a RPA system. Such solutions provide information collected from bot adapters within a single glass view that provides real-time bot monitoring, such as insights about a bot's health, activity, current configuration(s), scheduling, logging, and alerts. The bot management framework enables solutions that ensure the bots are run accurately, and without user intervention. The bot management framework also provides process related key performance indicators (KPIs), infrastructure metrics, and exception to SLAs. The bot management framework is powered by a common data model. Solutions built by employing the described bot management framework reduce operation and infrastructure costs as well as save time and resources.

Figure 1:
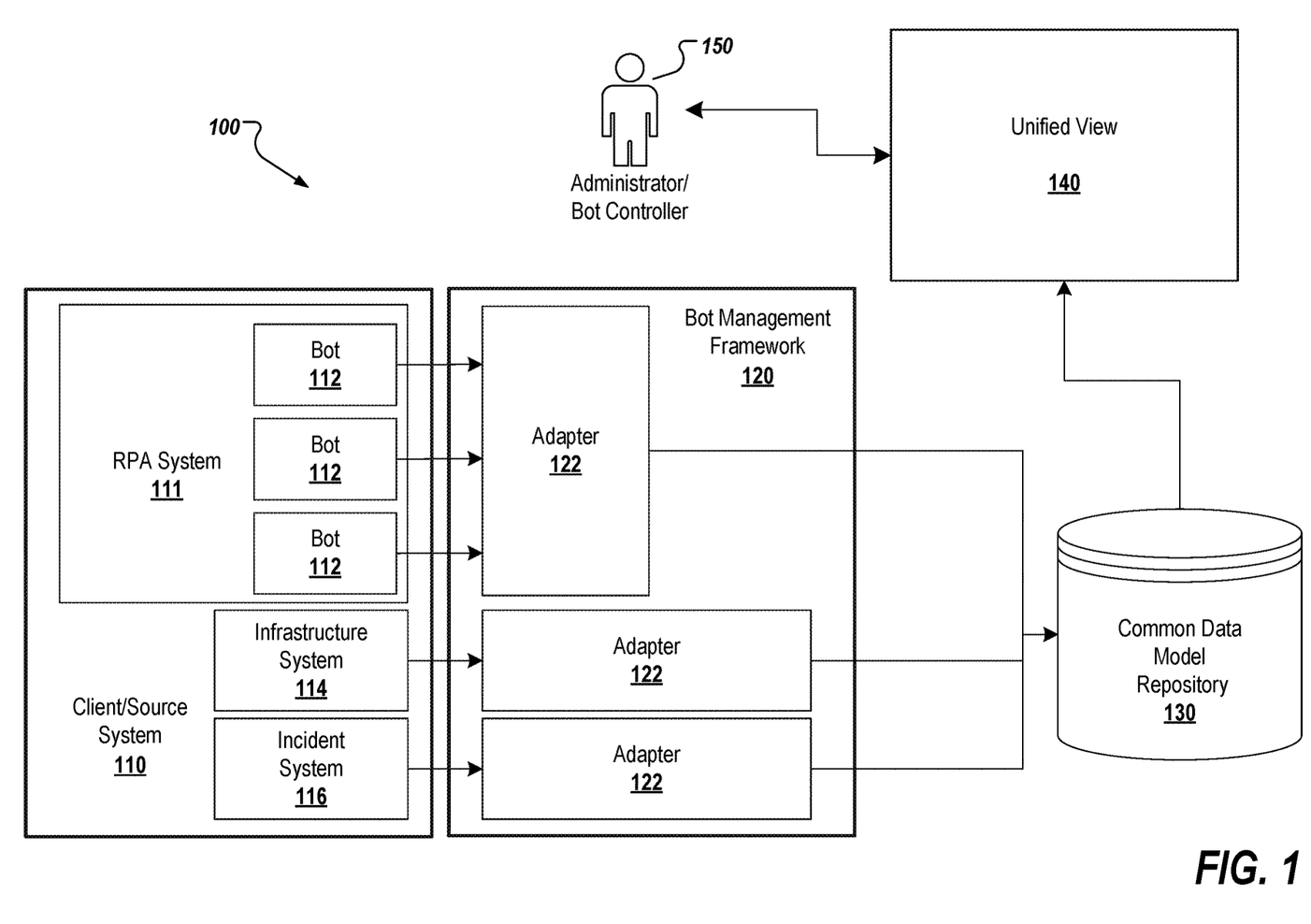
FIG. 1 depicts an example system employing a bot management framework.

FIG. 1 depicts an example system 100 employing a bot management framework. The example system 100 includes one or more client/source systems 110, a bot management framework 120, a common data model repository 130, a unified view 140, and one or more administrator(s)/bot controller(s) 150. In the depicted example, the example system 100, or portions thereof, may be deployed to any special purpose computer system. The example system may be provided using one or more computing device(s) of any suitable number and type of computing device. Configuration of such computing devices include shared, virtual, managed/dedicated, cluster/grid, cloud based resources, and/or any combination thereof. In some implementations, the RPA system 111 and the bot management framework may be deployed on separate systems communicating through a network (not shown). The system 100 provides accesses to the administrator/bot controller 150 through the unified view 140, which may be accessed over a network (not shown).

The client/source system 110 is deployed within an enterprise and includes the RPA system 111, infrastructure system 114, and incident system 116. The RPA system 111 is where processes are deployed to execute various software bots, such as bots 112, each of which may be assigned to perform a serious of defined tasks for a particular enterprise unit. The RPA System 111 may be deployed using an RPA product, such as Automation Anywhere™, UiPath™ NICE™, BluePrism™, EdgeVerve™, Workfusion™, Pega™, and so forth. The RPA System 111 includes a number of bots 112. As depicted in FIG. 1, three bots 112 are shown; however, any number bots 112 may be deployed within RPA system 111. As described above, bots 112 may be deployed to capture and interpret existing applications of the respective enterprise unit. For example, bots 112 may be deployed within RPA system 111 to execute automations, such as processing a transaction, manipulating data, triggering responses, and/or communicating with other systems. The RPA system 111 may provide, for example, security, enterprise grade compliance, and robust governance of the deployed bots. The RPA system 111 may be installed within the client/source system 110 in the Cloud or at the enterprise's premises on either physical or virtual machines. The RPA system 111 may be integrated to deliver enterprise-wide automation solutions by managing the deployed software bots 112. Each of the deployed bots 112 may generate execution logs and provide status updates as to the bot's health (e.g., state information, execution times, errors, and so forth). Additionally, the RPA system 111 may receive information regarding the machine to which a process executing a bot is deployed.

The example RPA system 111 includes the infrastructure system 114. In some implementations, the infrastructure monitoring system 114 includes monitoring tools, which monitor the information technology infrastructure used to support the RPA system 111 at the hardware, service, and application levels. The example RPA system 111 includes the incident system 116. In some implementations, the incident system 116 may include various incident management tools to handle and escalate incidents as they occur to, for example, restore defined service levels of the RPA system 111.

The bot management framework 120 includes one or more bot management adaptors 122, which may be deployed to service each RPA System 100. In the depicted example a single RPA system 111 is shown, however, multiple systems may be deployed. The described RPA framework includes a specific bot management adaptor 122 for each RPA product, as described above, that may be used to build the RPA system 111. The bot management adaptors 122 are built and deployed within the described bot management framework 120. The adaptors 122 integrate with the bots and processes executing the bots, though, for example, application programming interface (API) calls, and/or backend systems. Backend system integration may include, for example, stored procedure calls from a database deployed in the RPA system 111. In some implementations, each adapter 122 is configured based on the RPA product and its configuration used to implement the RPA system 111, as well as the infrastructure monitoring tools employed within the infrastructure monitory system 114, and the incident management tools employed within the incident system 116. In some implementations, RPA system 111 may be built using more than one RPA product. In such implementations, the bot management framework 120, may deploy a bot management adaptor 122 to retrieved information from bots built and deployed for each of the RPA products used in the RPA system 111.

The information is received and processed by adapters 122 is stored together in the common data model repository 130 for display in a common dashboard, i.e., unified view 140. In some implementations, an adaptor 122 extracts set data from a source bot 112 or a process executing the bot 112, verifies and validates the information, transform to the information according to a common data model, and persists the information in the common data model repository 130.

In some implementations, the bot management framework 120 raises a ticket in an incident management tool, such as Servicenow®, when an anomaly or incident is detected in the data received from the client/source system 110. For example, a ticket may be raised by the bot management framework 120 when a process related exception is raised in RPA system 111, e.g., a process fails during the execution; the infrastructure (e.g., CPU, Memory, Disk, Network, Software Change, EventLog, and so forth) executing the process for the client/source system 110 raises an alert, for example CPU Utilization is greater than a threshold; or a threshold level from a measured metric of the bots 112 is crossed. Example metrics measured for the bots 112 may include average handling time, productivity, volume, general bot status, efficiency, and utilization. More information is provided in FIG. 2 regarding the bot management adaptors 122.

The common data model repository 130 may be a relational database, such as Oracle, DB2, Structured Query Language (SQL) Server and so forth, implemented on an enterprise database server or virtual server. The repository 130 includes a common data model, which is a collation of tables with attributes related to one another in such a way as to define the logical structure between the sets of information collected from each of the deployed bots 112 in the RPA system 111 though a respective adaptor 122. The common data model is represented in the repository 130 through a schema or logical structure. The common data model provides a unified schema with which to capture metrics and KPIs from the RPA system 111 regardless of which particular RPA tool(s), infrastructure monitoring tool(s) and service management tool(s) are being employed by the RPA system 111. Such unified schema allows for seamless onboarding of new RPA, Infrastructure monitoring, and service management tools within RPA system 111.

The common data model repository 130 may contain information related to the bots deployed in the RPA system 111 such as alerts or errors raised by a bot; the state or status of each bot and related processes; transaction details, such as utilization and response times; general bot information, such as names, functional details, configuration details; and so forth. The common data model repository 130 may also contain information related to the infrastructure supporting the bots and processes in the RPA system 111, such as the health of a machine, processing usage, disk space usage and availability, network traffic, handling time, productivity, exceptions raised, as well as an administrator(s) to contact regarding an identified issue(s).

The unified view 140 includes a series of screens, which may be received and viewed on a user device using, for example, a web browser program. Pages may be generated on a server or virtual server and transmitted via a network. The unified view 140 is a single glass view that provides real-time monitoring of the bots and corresponding processes deployed and executing within the one or more RPA system 111. The information depicted in the unified view 140 provides insights about a bot's health, activity, current configuration(s), scheduling, logging, and alerts. The unified view 140 also includes preemptive reporting and monitoring of the bots and processes in the RPA system 111.

The unified view 140 may be a presentation interface that accepts input and provides output through various screens and/or pages. For example, web pages may be generated on a server or virtual server and transmitted via a network. The web pages may be received by a user device and viewed by the administrator/bot controller 150 through, for example, a web browser program. The unified view 140 provides access for a user, such as the administrator/bot controller 150, to the bot management framework built solution within example system 100, and more specifically, to the information received from the bot management adaptors 122 regarding the deployed bots 112 on the source RPA system 111, which is processed, modeled, and then stored in the common data model repository 130. The unified view 140 may be employed by administrator/bot controller 150 to monitor in real-time and proactively act on anomalies detected from the bots 112 and their related processes and/or any exceptions raised. Administrator/bot controller 150 may include bot controllers, process owners, and business users of the example system 100. In some example, an administrator is responsible to configure the master data. In some example, a bot controller is responsible to manage, monitor, and govern the machine where a bot/process is deployed (e.g., a box), a bot and corresponding process, and/or incidents in the configured environment.

Furthermore, analytics-based insights are provided through unified view 140 for continuous improvement and increased predictability in service levels, exceptions handling, and an automated audit trail and so that appropriate action can be taken proactively. Such analytics-based insights may include alerting the administrator 150 in case any business SLA is about to breach (i.e., reach a threshold), whether any of the bots 112 are overloaded or underutilized, whether any processes, such as the bots 112, productivity is low. The unified view 140 further provides administrator/bot controller 150 with screens to automatically raise an incident when any anomalies are detected or approaching a threshold within RPA system 111 at the infrastructure level, example of which may include CPU utilization, screen resolution changes, exceptions raised and which specific processes raise them, and so forth. Additionally, analytics-based insights for continuous improvement and increased predictability in service levels may also be depicted through the unified view 140. The determination and presentation to appropriate an administrator/bot controller 150 of these analytics-based insights drastically reduces exception handling time within the monitored RPA system 100 and allows for the bot 112 to quickly be brought back to an active mode/status. Additionally, by employing the above-mentioned machine learning capabilities trained based on the historical events of the system, the example system 100 is able to predict the category of incidents and to automatically allocate the appropriate user groups for each incident.

In some implementations, the unified view 140 provides a single view for end to end transactions of an entire bot life cycle and resolves ticket issues and/or escalates higher-order problems to assigned administrators. The unified view 140 is accessible through, for example, an authentication model, which may include various user roles. In some implementations, a custom authentication module may be employed to authenticate users, such as the administrator 150. The unified view 140 is discussed in more detail in the description of FIGS. 3A-B.

Figure 2:
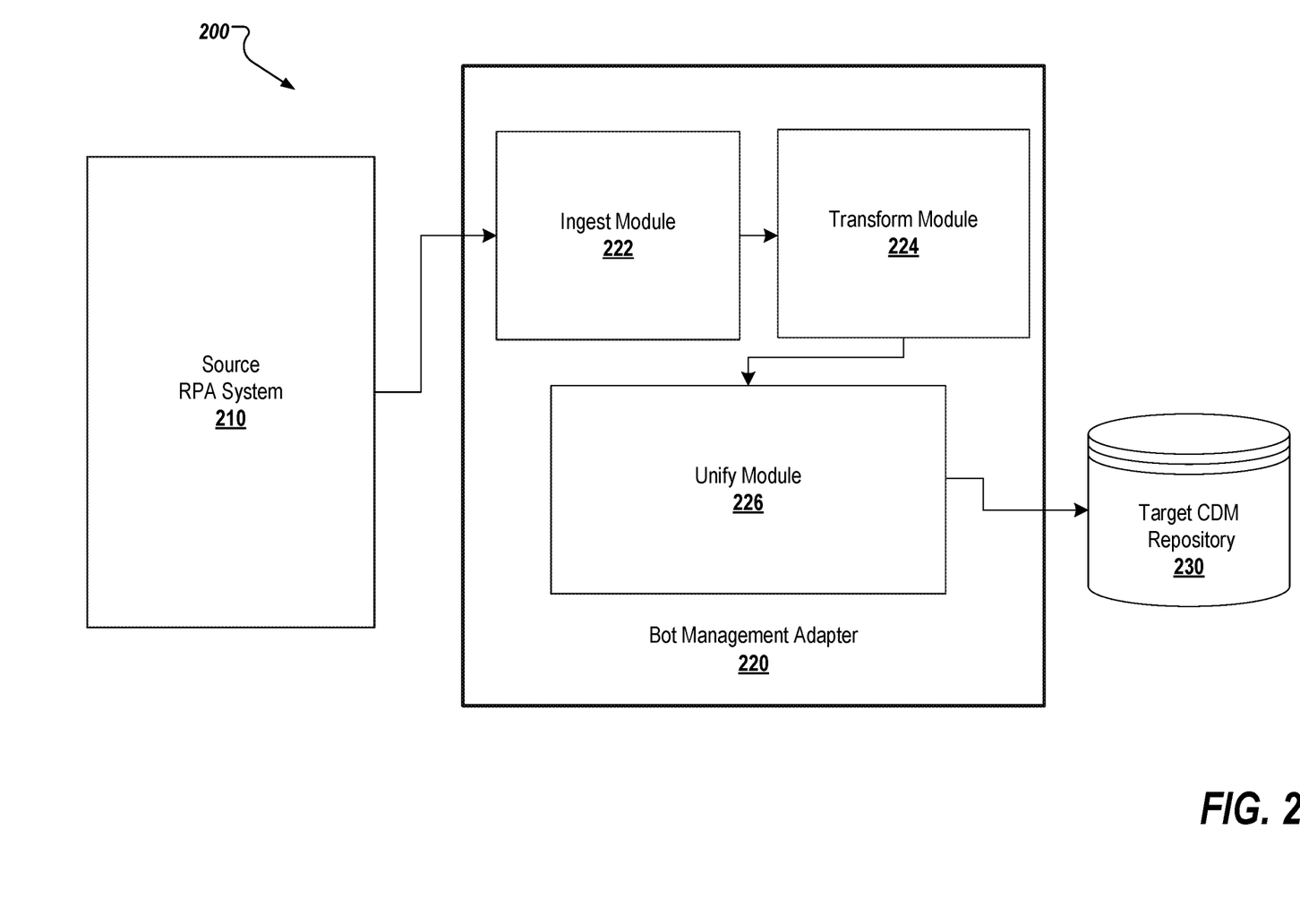
FIG. 2 depicts an example implementation built using a bot management framework.

FIG. 2 depicts an example implementation 200 built using the described bot management framework deployed in a system, such as system 100 of FIG. 1. The depicted implementation 200 includes a source RPA system 210, a bot management adaptor 220, and a target repository 230. The bot management adaptor 220 is substantially similar to bot management adaptors 122 of FIG. 1 and the target common data model repository 230 is substantially similar to a common data model repository 130 of FIG. 1. The source RPA system 210 includes support systems, such as infrastructure and/or incident systems 114 and 116 of FIG. 1, as well as processes employed to execute bots, such as bots 112 of FIG. 1, and support the execution of their assigned task(s). The adapter 220 communicates with and receives information from source RPA system 210 regarding, for example, the status of the deployed bots. The adapter 220 may be in written in a variety of programming language, such as C#, C++, Java, Scala, Python, and so forth, which are selected based on system requirements. In some implementations, a bot scheduler (i.e., a Windows Service) is used to manage the adapters and/or execute the adapters based on their respective configuration(s).

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from an RPA system, such as RPA systems 111 and 210.

As depicted in FIG. 2, the adapter 220 includes ingest module 222, transform module 224, and unify module 226. The adapter 220 is built and configured according to the described bot management framework to, for example, establish communication with the source RPA system 210 based on the configuration of the adapter 220. The ingest module 222 establishes a connection to the RPA system 210 through which it receives information from the RPA system 210. In some implementations, the connection may be established through database access provided by RPA system 210. In such implementations, the ingest module 222 accesses and retrieves data through, for example, stored procedure calls with appropriate polling mechanisms. In other implementations, the connection may be established through API calls to an API provided by RPA system 210. In such implementations, the ingest module 222 accesses and retrieves data through the API calls.

As described above, the ingest module 222 may be configured to receive information regarding the processes executing the various software bots deployed within the RPA system 210, the state or status of the infrastructure supporting the RPA system 210, and/or any incidents or alerts that have been raised in the RPA system 210. In some implementations, adapter 222 may be built to retrieve data at process level of the corresponding source RPA system 210. In such implementations, data retrieval may be scheduled as a batch job, which may be configured to execute every N number of hours or, in a more near-real time configuration, such as every 5 to 10 minutes. These configurations may be changed as system requirements are updated or altered.

The information retrieved from source RPA system 210 may include alerts or errors raised by a bot; the state or status of each bot and related processes; transaction details, such as utilization and response times; general bot information, such as names, functional details, configuration details; and so forth. Infrastructure information, such as the health of a particular machine, processing usage, disk space usage and availability, network traffic, handling time, productivity, and/or exceptions raised may also be included in the received information.

The transform module 224 validates and verifies the information received from the RPA system 210 through the ingest module 222. Data validation ensures that received information is clean, correct, meaningful, and conforms with the data requirements of the implementation 200, while data verification ensures the integrity and authenticity of received information. The transform module 224 can perform data validation and verification on received information based on, for example, the metadata included with the information. The transform module 224 may use validation procedures, such as data validation rules, constraints, or check routines, to ensure the data in the received information is valid. These rules may be implemented through data dictionaries or by enforcing integrity or procedure based on, for example, business rules. In some implementations, the transform module 224 can validate received data by, for example, ensuring only delta data load happens instead if a full load from the source RPA system 210. In some implementations, the data is loaded in sequence to ensure the data integrity is maintained in terms of primary foreign key relationships created across the tables within the common data model employed within target CDM repository 230.

The transform module 224 transforms the received data according to the common data model from the target common database model repository 230. In some implementations, the transform module 224 transforms the received data based on the common data model through semantic analysis and deep learning solutions using, for example, a trained AI model to determine categorization and assignment of tickets. The transformation may be based on, for example, keywords that are identified in the unstructured incident description as received from the RPA system 210. In such implementations, the transform module 224 may process the received information to understands language and emotion, which provides consistent-high quality responses. The AI models employed within transform module 224 may be trained through a series of machine learning techniques applied to an algorithm using, for example, previously determined responses and categorizations of incidents raised within the RPA system 210 and/or training data provided by system administrators, which may include human agent observation. Such machine learning techniques automates model building and allows for the discovery of insights without explicit programming. Using automated and iterative algorithms, models may be trained to find high-order interactions and patterns within data.

Figure 3A:
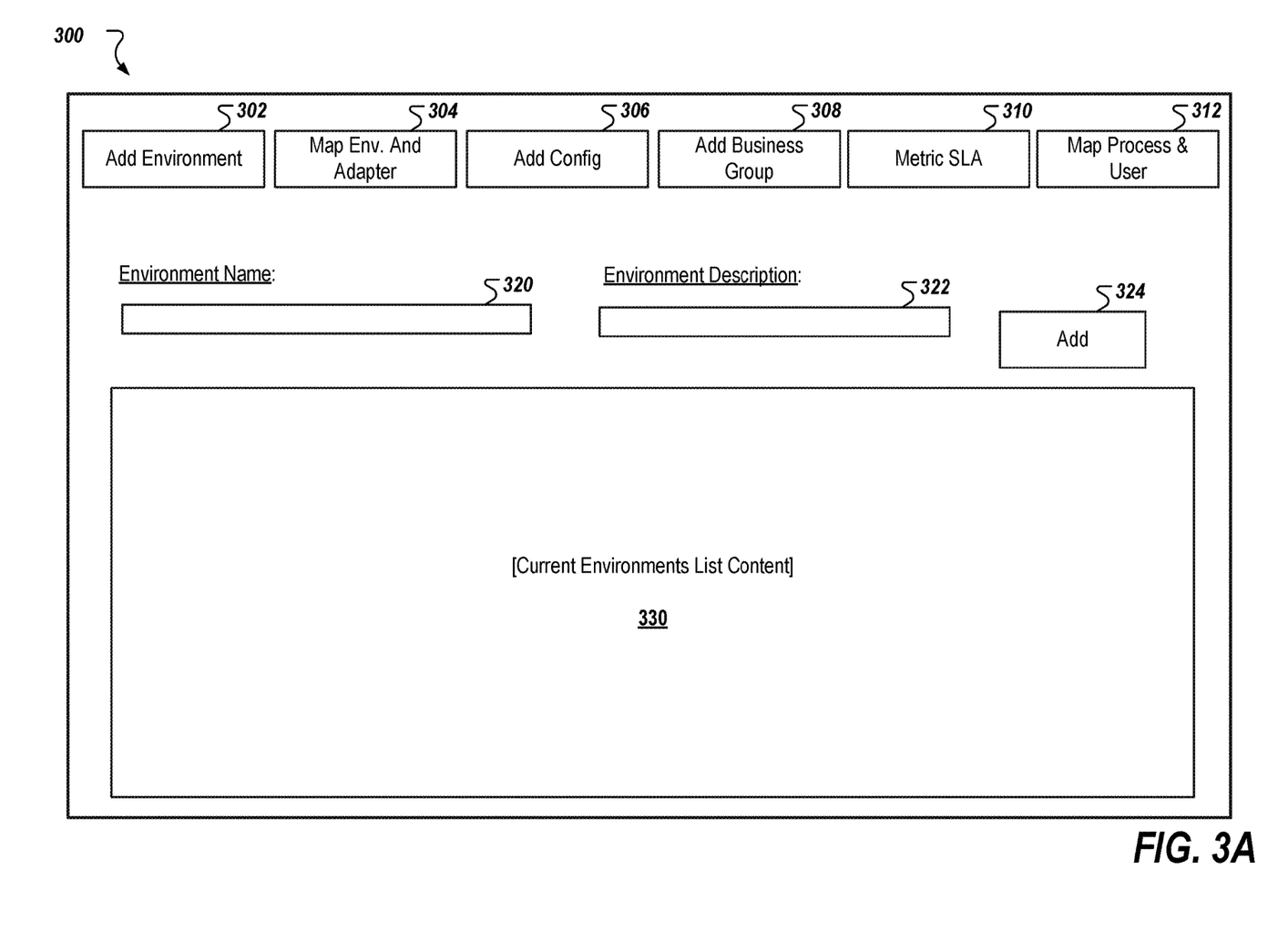
FIG. 3A depicts an environment screen from an example unified view.

The transform module 224 may analyze received unstructured or structured claims data to identify optimization opportunities in automated processes, which includes reduction of errors in, for example, images, handwriting, or speech recognition. In some implementations, the transform module 224 transforms the received data in such a way that each record from the source RPA system 210 is properly mapped to the respective tables in the common data model based on, for example, the entity relationship created. This mapping allows for depiction, through a unified view, such a unified view 140 of FIG. 1, of the KPIs and when new data is pulled into the common data model in the target common data model repository 230. Once the information has been transformed according to the common data model, the unify module 226 persists the transformed information to the target common database model repository 230 according to the repository type. For example, the target repository 230 may be a relational database, such as Oracle, DB2, SQL server and so forth FIG. 3A depicts an environment screen 300 from an example unified view for the example system 100. The environment screen 300 includes graphical form elements including an add environment button 302, a map environment and adapter button 304, an add configuration button 306, an add business group button 308, a metric SLA button 310, a map process and user button 312, an environment name text box 320, an environment description text box 322, an add button 324, and an environment list content area 326.

In the depicted example, the top row of buttons (302-312) provide a menu for a user to select between various administration screens provided by the unified view 140. The depicted example is a screen to add an environment to the system. Similar screens may be used for each of the menu buttons (302-312). Specifically, the map environment and adapter button 304 links to a page that provides functionality to allow a user to map an environment to and an adapter, the add configuration button 306 links to a page that provides functionality to allow a user to add confirmations to the system, the add business group button 308 links to a page that provides functionality to allow a user to add a business group to the system, the metric SLA button 310 links to a page that provides functionality to allow a user to add a metric SLA to the system, and the map process and user button 312 links to a page that provides functionality to allow a user to map a process and a user within the system. Business groups may be equivalent to departments or lines of business within a client organization, such as Human Resources, Marketing, and so forth, where the processes can be grouped and tracked in the example unified view. Metric SLAs may include, for example, whether a process has run within a defined time frame, such as between 8-9 AM, or whether a process is completed within a defined number seconds. Mapping a process to a user includes the way the Client personas, such as administrators 150 of FIG. 1 (e.g., bot controllers, process owners, and business users), are able to view, through the example unified view, relevant metrics to the particular processes and tasks assigned to each Client persona.

The environment name text box 320 and environment description text box 322 enables a user to enter an environment name and a description regarding the environment. If the user decides to add the entered environment information, the user selects (e.g., clicks on) the add button 324. In some implementations, when the user selects the add button 324, the appropriate processes, bots, and infrastructure metrics are mapped to an environment identifier for the entered environment allowing for the environment related metrics to be displayed within the example unified view.

The environment list content area 326 displays information regarding previously added environments to the system. The information provided in the environment list 326 includes an environment's name and description and allows the use to take an action, such a removing the environment form the list. Added environments correspond to the RPA systems depicted in FIGS. 1 and 2.

Figure 3B:
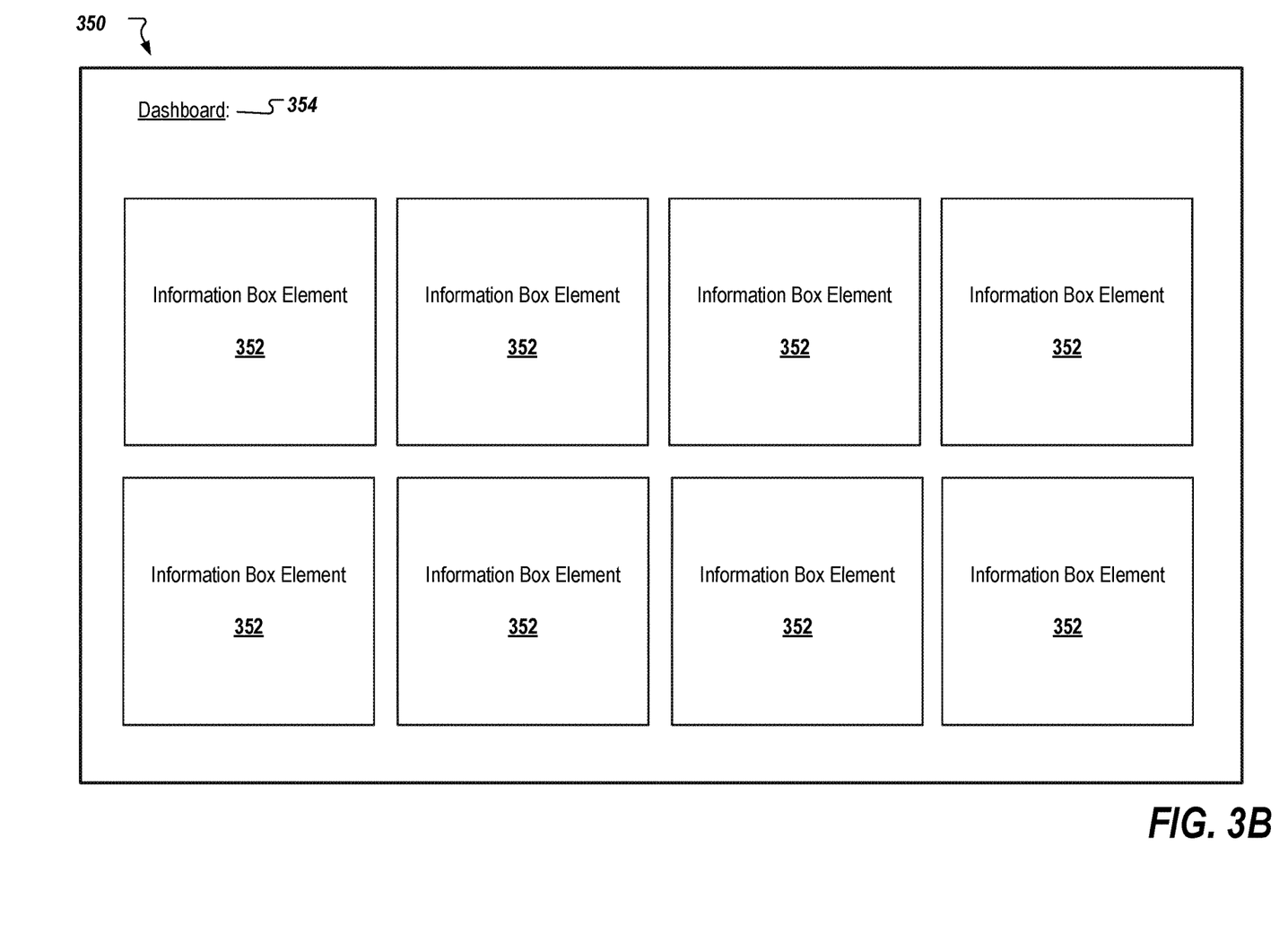
FIG. 3B depicts a dashboard screen from an example unified view.

FIG. 3B depicts a dashboard screen 350 from an example unified view for the example system 100. The dashboard screen 350 provides a single glass view of a corresponding RPA system process categorized according to a respective common data model. For example, the dashboard screen 350 provides real-time bot monitoring about, for example, a bot's health, activity, current configuration(s), scheduling, logging, and alerts. The dashboard screen 350 also provides information regarding the infrastructure used to support the RPA system at the hardware, service, and application levels as well as information provided by incident management tools. The dashboard screen 350 includes a series of graphical information box elements 352 and a dashboard menu link 354. The dashboard menu link 354 may be a part of a larger menu displayed on the dashboard screen 350. The dashboard menu link 354 links the user to the dashboard screen 350.

Graphical information box elements 352 may display three levels of information: 1) summary view, 2) detailed view, and 3) trend view for box, bot, and process. Each of the depicted information box elements 352 may contain different information regarding the corresponding RPA system, such as RPA system 111 and 210 of FIGS. 1 and 2 respectively. The number of and particular information displayed in each of the information box elements 352 may be configured by the user of a unified view. Example information regarding a corresponding RPA systems that can be displayed in the information box elements 352 includes a total number of processes and whether the processes have been terminated and/or completed, an average handling time of each monitored process, a productivity percentage for each monitored process, an indication of each monitored process's volume, exception thrown by each monitored process, a list of monitored process and bots, the efficiency of each monitored process and bot, the utilization (hourly or daily) of each monitored process and bot, the alerts from each monitored process and bot, the critical incidents of each monitored process and bot, a number of total open incidents within the RPA system, and a list of any incident SLAs. The proceeding examples and description of the types of information regarding a corresponding RPA system that can be displayed in the information box elements 352 are illustrative and are not to be construed as limiting.

Figure 4:
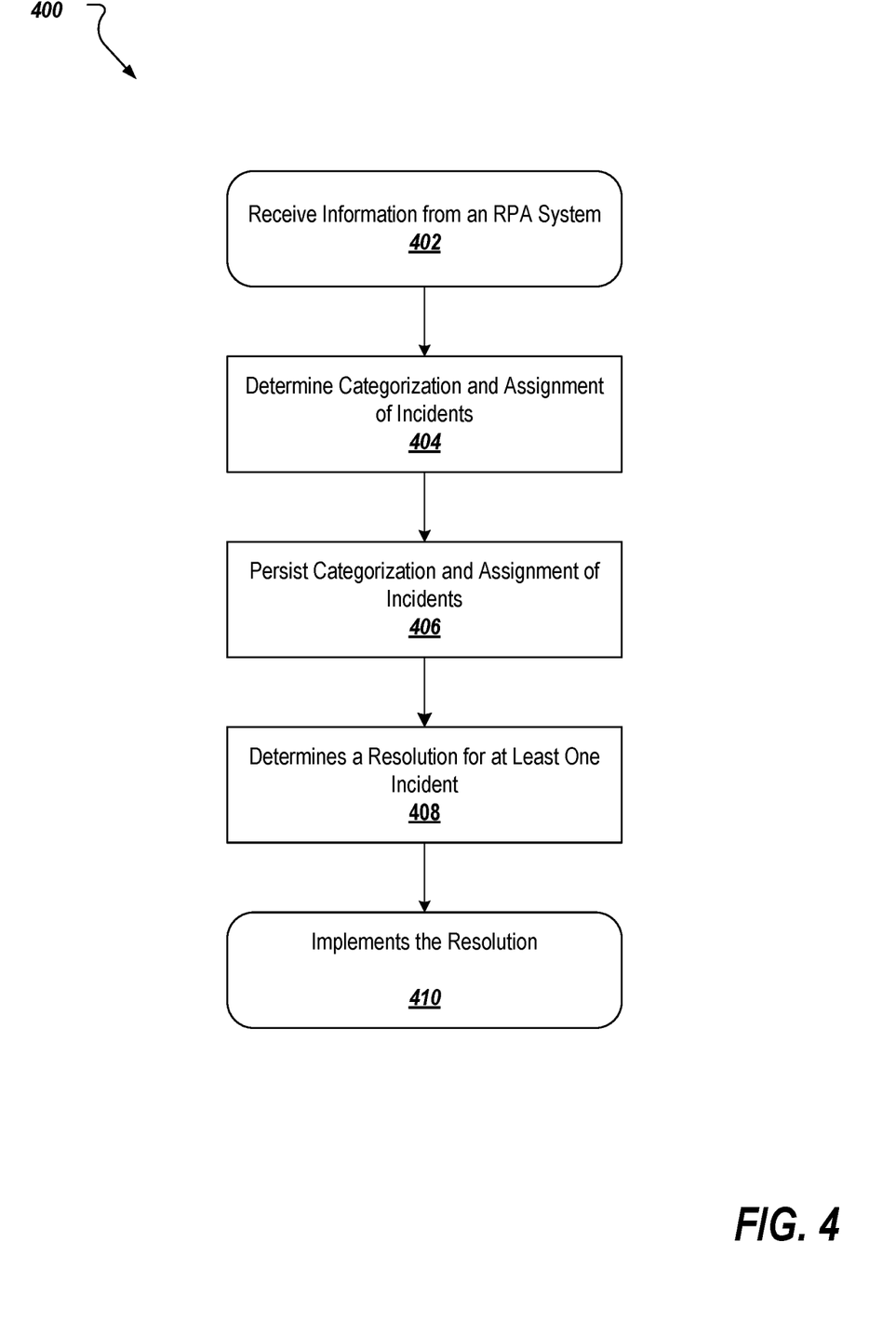
FIG. 4 depicts a flow diagram of an example process used within a system employing a bot management framework to resolve ticket issues.

FIG. 4 depicts a flow diagram of an example process (400) used within a system employing the described bot management framework, such as example system 100, to resolve ticket issues. An adapter receives (402) information from an RPA system regarding bots deployed within the RPA system. The received information may include unstructured incident descriptions based on the incidents, such as alerts and exceptions, raised by the bots within the RPA system. The received information may include incident descriptions structured or formatted according to the specifications of the RPA product employed to build the RPA system, such as information retrieved through a stored procedure and bot/system API call. The adapter determines (404) categorization and assignment of incidents according to a common data model and based on a semantic analysis through a trained AI model of the incident descriptions. The categorization and assignment of incidents are persisted (406) in a common data model repository. The adaptor, determines (408) a resolution based on the AI model for at least one of the incidents based on the respective determined categorization and assignment of the at least one incident. The adaptor implements (410) the resolution, and the process ends.

Figure 5:
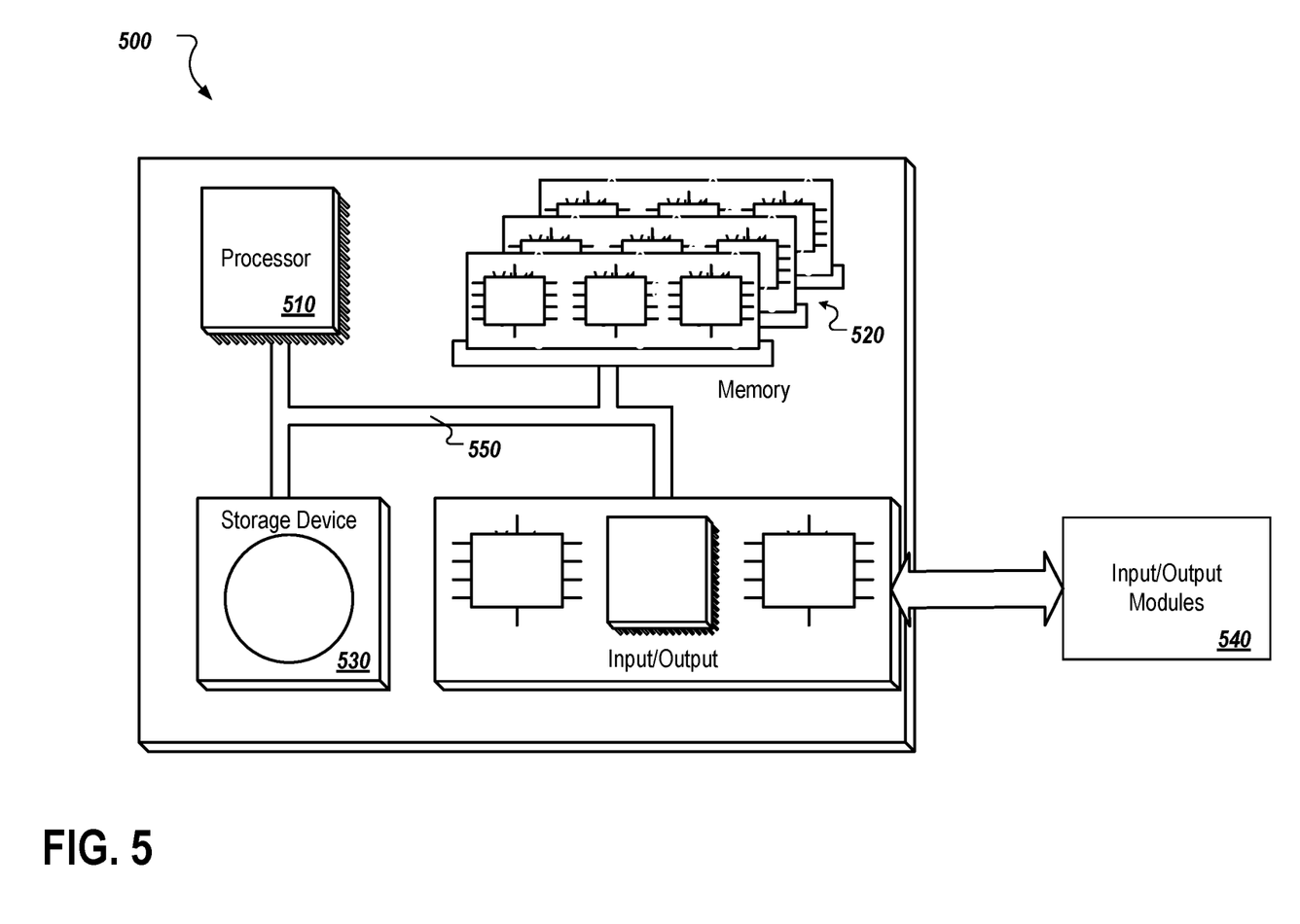
FIG. 5 is a schematic diagram of an example computer system.

FIG. 5 is a schematic diagram of an example computer system 500. The system 500 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., machine learning engine(s)) and their structural equivalents, or in combinations of one or more of them. The system 500 is intended to include various forms of digital computers, such as laptops, desktops, workstations, personal digital assistants, servers, blade servers, mainframes, and other appropriate computers, including vehicles installed on base units or pod units of modular vehicles. The system 500 can also include mobile devices, such as personal digital assistants, cellular telephones, smartphones, and other similar computing devices. Additionally, the system can include portable storage media, such as Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510 (e.g., processor 213), a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
    receiving, by an adapter and from a robotic process automation (RPA) system connected to the adapter, information regarding a software bot deployed within the RPA system to perform an assigned task, the information including incident data from an anomaly in the RPA system occurring while the software bot performed the assigned task, the adapter being one of a plurality of adapters and specific to the RPA system, and being deployed to service the RPA system, the software bot being associated with a particular RPA tool, and the anomaly comprising one of an alert and an error raised by the software bot;
    validating the incident data according to data validation rules assigned to the RPA system based on a delta data load validation of metadata included in the incident data;
    determining, by the adapter, categorization and assignment of the anomaly based on a semantic analysis of the incident data to understand key word language and emotion of the incident data for insight discovery;
    mapping, by the adapter, the received incident data according to a common data model based on the categorization and the assignment of the anomaly, the common data model being stored in a common data model repository connected to the adapter and providing a uniform schema by which to process incident data for multiple different RPA tools including the particular RPA tool;
    determining, by the adapter, a resolution for the anomaly based on an analysis through a trained artificial intelligence (AI) model of the mapped incident data; and
    executing the determined resolution by proactively bringing the software bot to a designated performance level.

2. The method of claim 1, further comprising:
    before mapping the received incident data, validating the received incident data according to data validation rules assigned to the RPA system based on metadata included in the received information.

3. The method of claim 1, further comprising:
    sending the resolution and mapped incident data for the anomaly to a unified view for display to an administrator.

4. The method of claim 1, wherein the anomaly is one of the software bot being overloaded, the software bot being underutilized, a metric approaching a threshold regarding a breach of a service level agreement (SLA), an exception raised by the software bot or process associated with the software bot, or a central processing unit (CPU) utilization of an infrastructure assigned to execute the software bot reaching a threshold.

5. The method of claim 1, wherein the resolution includes allocating the anomaly to a user group.

6. The method of claim 1, wherein the resolution includes steps to proactively bring the software bot to a designated performance level.

7. The method of claim 1, wherein the resolution includes following an escalation procedure that includes alerting a bot controller assigned to the software bot of the anomaly and determined resolution.

8. The method of claim 1, further comprising:
    persisting the incident data mapped according to the common data model.

9. The method of claim 1, wherein the AI model is trained using historical events of the RPA system.

10. The method of claim 1, wherein receiving the information regarding the software bot occurs at a scheduled interval and comprises a delta of any previous information received.

11. One or more non-transitory computer-readable storage media coupled to one or more processors and having instructions stored thereon which, when executed by the one or more processors, cause the one or more processors to perform operations comprising:
receiving, by an adapter and from a robotic process automation (RPA) system connected to the adapter, information regarding a software bot deployed within the RPA system to perform an assigned task, the information including incident data from an anomaly in the RPA system occurring while the software bot performed the assigned task, the adapter being one of a plurality of adapters and specific to the RPA system, and being deployed to service the RPA system, the software bot being associated with a particular RPA tool, and the anomaly comprising one of an alert and an error raised by the software bot;
validating the incident data according to data validation rules assigned to the RPA system based on a delta data load validation of metadata included in the incident data;
determining, by the adapter, categorization and assignment of the anomaly based on a semantic analysis of the incident data to understand key word language and emotion of the incident data for insight discovery;
mapping, by the adapter, the received incident data according to a common data model based on the categorization and the assignment of the anomaly, the common data model being stored in a common data model repository connected to the adapter and providing a uniform schema by which to process incident data for multiple different RPA tools including the particular RPA tool;
determining, by the adapter, a resolution for the anomaly based on an analysis through a trained artificial intelligence (AI) model of the mapped incident data; and
executing the determined resolution by proactively bringing the software bot to a designated performance level.

12. The one or more non-transitory computer-readable storage media of claim 11, wherein the operations further comprise:
before mapping the received incident data, validating the received incident data according to data validation rules assigned to the RPA system based on metadata included in the received information.

13. The one or more non-transitory computer-readable storage media of claim 11, wherein the operations further comprise:
sending the resolution and mapped incident data for the anomaly to a unified view for display to an administrator.

14. The one or more non-transitory computer-readable storage media of claim 11, wherein the anomaly is one of the software bot being overloaded, the software bot being underutilized, a metric approaching a threshold regarding a breach of a service level agreement (SLA), an exception raised by the software bot or process associated with the software bot, or a central processing unit (CPU) utilization of an infrastructure assigned to execute the software bot reaching a threshold.

15. The one or more non-transitory computer-readable storage media of claim 11, wherein the resolution includes allocating the anomaly to a user group.

16. A system, comprising:
one or more processors; and
a computer-readable storage device coupled to the one or more processors and having instructions stored thereon which, when executed by the one or more processors, cause the one or more processors to perform operations comprising:
receiving, by an adapter and from a robotic process automation (RPA) system connected to the adapter, information regarding a software bot deployed within the RPA system to perform an assigned task, the information including incident data from an anomaly in the RPA system occurring while the software bot performed the assigned task, the adapter being one of a plurality of adapters and specific to the RPA system, and being deployed to service the RPA system, the software bot being associated with a particular RPA tool, and the anomaly comprising one of an alert and an error raised by the software bot;
validating the incident data according to data validation rules assigned to the RPA system based on a delta data load validation of metadata included in the incident data;
determining, by the adapter, categorization and assignment of the anomaly based on a semantic analysis of the incident data to understand key word language and emotion of the incident data for insight discovery;
mapping, by the adapter, the received incident data according to a common data model based on the categorization and the assignment of the anomaly, the common data model being stored in a common data model repository connected to the adapter and providing a uniform schema by which to process incident data for multiple different RPA tools including the particular RPA tool;
determining, by the adapter, a resolution for the anomaly based on an analysis through a trained artificial intelligence (AI) model of the mapped incident data; and
executing the determined resolution by proactively bringing the software bot to a designated performance level.

17. The system of claim 16, wherein the resolution includes steps to proactively bring the software bot to a designated performance level.

18. The system of claim 16, wherein the resolution includes following an escalation procedure that includes alerting a bot controller assigned to the software bot of the anomaly and determined resolution.

19. The system of claim 16, wherein the AI model is trained using historical events of the RPA system.

20. The system of claim 16, wherein receiving the information regarding the software bot occurs at a scheduled interval and comprises a delta of any previous information received.

* * * * *